United States Patent
Sasaki et al.

(10) Patent No.: US 12,545,803 B2
(45) Date of Patent: Feb. 10, 2026

(54) COATING AGENT, RESIN MEMBER, AND PRODUCTION METHOD THEREFOR

(71) Applicants: KABUSHIKI KAISHA TOYOTA JIDOSHOKKI, Kariya (JP); Tokyo University of Science Foundation, Tokyo (JP)

(72) Inventors: Ayano Sasaki, Aichi (JP); Sayako Sato, Aichi (JP); Hidenori Munekata, Aichi (JP); Motoshige Isobe, Aichi (JP); Hisashi Muramatsu, Aichi (JP); Koji Arimitsu, Tokyo (JP)

(73) Assignees: KABUSHIKI KAISHA TOYOTA JIDOSHOKKI, Kariya (JP); Tokyo University of Science Foundation, Tokyo (JP)

( * ) Notice: Subject to any disclaimer, the term of this patent is extended or adjusted under 35 U.S.C. 154(b) by 376 days.

(21) Appl. No.: 18/036,306

(22) PCT Filed: Nov. 12, 2021

(86) PCT No.: PCT/JP2021/041652
§ 371 (c)(1),
(2) Date: May 10, 2023

(87) PCT Pub. No.: WO2022/102732
PCT Pub. Date: May 19, 2022

(65) Prior Publication Data
US 2023/0407127 A1    Dec. 21, 2023

(30) Foreign Application Priority Data

Nov. 16, 2020  (JP) .................... 2020-189973
May 11, 2021   (JP) .................... 2021-080403
Aug. 9, 2021   (JP) .................... 2021-130409

(51) Int. Cl.
C09D 133/14   (2006.01)
C08J 7/04     (2020.01)
(Continued)

(52) U.S. Cl.
CPC .......... C09D 133/14 (2013.01); C08J 7/0427 (2020.01); C09D 4/00 (2013.01); C09D 7/63 (2018.01);
(Continued)

(58) Field of Classification Search
CPC .......... C09D 133/14; C09D 4/00; C09D 7/63; C09D 183/10; C09D 4/06; C09D 143/04;
(Continued)

(56) References Cited

U.S. PATENT DOCUMENTS 11,180,579 B2   11/2021  Arimitsu et al.
2006/0172136 A1  8/2006  Komori et al.
2021/0070893 A1  3/2021  Arimitsu et al.

FOREIGN PATENT DOCUMENTS

JP    2006-240294 A    9/2006
JP    2007-217287 A    8/2007
(Continued)

OTHER PUBLICATIONS

English Translation of Written Opinion of the International Searching Authority (PCT/ISA/237) dated Feb. 1, 2022 issued by the International Searching Authority in International Application No. PCT/JP2021/041652.
(Continued)

*Primary Examiner* — Michael B Nelson
(74) *Attorney, Agent, or Firm* — Sughrue Mion, PLLC

(57) ABSTRACT

A coating agent has: a film-forming component containing an organosilicon compound having a radical polymerizable functional group and an alkoxysilyl group; and a film-curing component composed so that a base and a radical can be
(Continued)

generated on irradiation with ultraviolet light. The film-curing component includes a nonionic photobase generator having no ionic bond in the molecular structure. The content of the nonionic photobase generator is 0.1 parts by mass or more and 50 parts by mass or less, based on 100 parts by mass of the organosilicon compound.

8 Claims, 4 Drawing Sheets

(51) Int. Cl.
    *C09D 4/00*     (2006.01)
    *C09D 7/63*     (2018.01)
    *C09D 183/10*     (2006.01)

(52) U.S. Cl.
    CPC .......... *C09D 183/10* (2013.01); *C08J 2369/00* (2013.01); *C08J 2433/14* (2013.01); *C08J 2483/10* (2013.01)

(58) Field of Classification Search
    CPC ... C09D 183/04; C08J 7/0427; C08J 2369/00; C08J 2433/14; C08J 2483/10; C08J 7/18; C08J 2483/04; C08J 7/046; C08F 283/124; C08F 290/068; C08G 77/20; C08G 77/24
    See application file for complete search history.

(56) References Cited

FOREIGN PATENT DOCUMENTS

| JP | 2020-33530 A | 3/2020 |
|---|---|---|
| WO | 2016/063978 A1 | 4/2016 |
| WO | 2018/207836 A1 | 11/2018 |
| WO | 2019/116931 A1 | 6/2019 |

OTHER PUBLICATIONS

International Search Report for PCT/JP2021/041652 dated Feb. 1, 2022.

German Office Action dated Aug. 14, 2024 in Application No. 11 2021 005 989.0.

COATING AGENT, RESIN MEMBER, AND PRODUCTION METHOD THEREFOR

CROSS REFERENCE TO RELATED APPLICATIONS

This application is a National Stage of International Application No. PCT/JP2021/041652 filed Nov. 12, 2021, claiming priority based on Japanese Patent Application No. 2020-189973 filed Nov. 16, 2020, Japanese Patent Application No. 2021-080403 filed May 11, 2021 and Japanese Patent Application No. 2021-130409 filed Aug. 9, 2021.

TECHNICAL FIELD

The present disclosure relates to a coating agent, a resin member, and a method for producing the member.

BACKGROUND ART

In the past, inorganic materials such as steel, aluminum, and glass have been used for parts constituting vehicles such as automobiles and railways. In recent years, the replacement of parts made of inorganic materials with parts made of organic materials such as a plastic has been progressed for the purpose of weight reduction for vehicles. The organic materials are, however, lighter than the inorganic materials, but are soft and easily scratched.

Then, for improving the durability of parts made of organic materials against scratches, techniques for forming hard films on the surfaces of the parts have been proposed. For example, Patent Document 1 describes a covering member including a resin substrate, a primer layer formed on the surface of the resin substrate, and a hard coat layer formed on the primer layer.

For forming a film that has a two-layer structure composed of a primer layer and a hard coat layer as with the covering member in Patent Document 1, however, it is required to sequentially perform a step of applying a primer onto a resin substrate, a step of drying the primer to form a primer layer, a step of applying a coating agent onto the primer layer, and a step of curing the coating agent to form a hard coat layer. Thus, the work for forming the film becomes complicated, and the cost required for the work for forming the film increases.

To address such a problem, a coating agent including: a film-forming component containing an organosilicon compound (A) having a radical polymerizable functional group, a fluoroalkyl group, and an alkoxysilyl group; and a photobase generator that generates a base and a radical on irradiation with ultraviolet light is proposed (Patent Document 2). The coating agent in Patent Document 2 makes it possible for a single coating film to function equivalently to a conventional film that has a two-layer structure.

PRIOR ART LITERATURE

Patent Documents

Patent Document 1: JP-A-2006-240294
Patent Document 2: JP-A-2020-33530

SUMMARY

The photobase generator included in the coating agent in Patent Document 2 is an ionic photobase generator that has an anion and a cation bonded by an ionic bond. In the ionic photobase generator, a state in which an anion and a cation are bonded to each other and a state in which a free acid and a free base are separated from each other, are in a chemical equilibrium, and thus, even when the coating agent is not irradiated with light, a small amount of free base can be present in the coating agent.

For this reason, the coating agent in Patent Document 2 has a problem that the sol-gel reaction of the film-forming component is likely to proceed gradually even in the dark due to a trace amount of free base liberated from the ionic photobase generator.

The present disclosure has been made in view of such a background, and an object of the present disclosure is to provide a coating agent that is excellent in adhesion to a substrate made of a resin, makes it possible to form a coating film with high durability against scratches in accordance with a simple operation, and is excellent in storage stability, a resin member with a coating film formed from the coating agent, and a method for producing the resin member.

An aspect of the present disclosure provides a coating agent including:
  a film-forming component containing an organosilicon compound having a radical polymerizable functional group and an alkoxysilyl group; and
  a film-curing component composed so that a base and a radical can be generated on irradiation with ultraviolet light, wherein
  the film-curing component contains a nonionic photobase generator having no ionic bond in a molecular structure, and
  a content of the nonionic photobase generator is 0.1 parts by mass or more and 50 parts by mass or less, based on 100 parts by mass of the organosilicon compound.

Another aspect of the present disclosure provides a resin member including:
  a substrate made of a resin; and
  a coating film made of a cured product of the coating agent according to the aspect mentioned above and disposed on a surface of the substrate, wherein
  the coating film has:
    a structural unit derived from the radical polymerizable functional group; and
    a structural unit having a siloxane bond.

In the coating agent, the film-forming component containing the organosilicon compound having the specific functional group, and the film-curing component are included. By irradiating the coating agent that has such a composition with ultraviolet light, a base and a radical can be generated in the coating agent.

The base generated from the film-curing component reacts with the alkoxysilyl group contained in the organosilicon compound, and thus can proceed with the curing between the organosilicon compounds by a sol-gel reaction. In addition, the radical generated from the film-curing component reacts with the radical polymerizable functional group contained in the organosilicon compound, and thus can proceed with the radical polymerization of these functional groups.

As described above, the coating agent can proceed with the sol-gel reaction and the radical polymerization in parallel when an ultraviolet light is irradiated. As a result, a coating film can be formed in which an organic component bonded by the radical polymerization and an inorganic component bonded by the sol-gel reaction are mixed together.

In addition, the film-curing component includes the nonionic photobase generator without any ionic bond in the molecular structure (hereinafter, "photobase generator").

The photobase generator has no ionic bond in the molecular structure, thus making it possible to reduce liberation of the base in the dark. Thus, by use of the photobase generator, the storage stability of the coating agent can be improved.

The coating film formed by the method mentioned above has a structural unit derived from at least one of an acryloyl group and a methacryloyl group at the interface between the film and the substrate made of a resin. Thus, the coating film is excellent in adhesion to the substrate. In addition, the coating film includes a structural unit having a siloxane bond, that is, an inorganic component formed by a sol-gel reaction. The presence of the inorganic component makes it possible to enhance the hardness of the surface of the coating film.

As described above, the aspect mentioned above can provide a coating agent that is excellent in adhesion to a substrate made of a resin, makes it possible to form a coating film with high durability against scratches by means of a simple operation, and is excellent in storage stability.

DETAILED DESCRIPTION

Coating Agent

Figure 1:
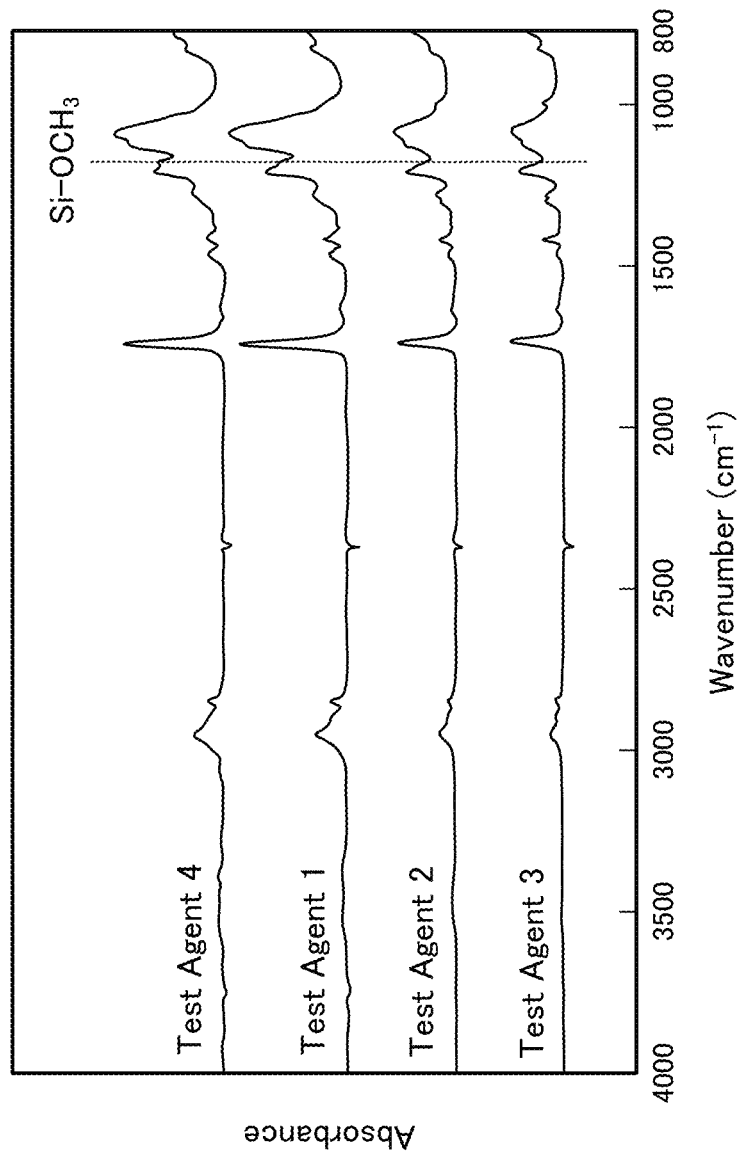
FIG. 1 is an explanatory diagram showing infrared absorption spectra of coating films prepared from test agents 1 to 4 in Example 1.

The components included in the coating agent will be described.
[Film-Forming Component]
—Organosilicon Compound The coating agent contains, as a film-forming component, an organosilicon compound having a radical polymerizable functional group and an alkoxysilyl group.

The radical polymerizable functional group contained in the organosilicon compound may be any functional group that can be polymerized by radical polymerization. As the radical polymerizable functional group, for example, an acryloyl group, a methacryloyl group, and the like can be used. The organosilicon compound may have, as the radical polymerizable functional group, only one kind of functional group selected from these functional groups, or may have two or more kinds of functional groups thereof. From the viewpoint of enhancing the reactivity in the radical polymerization reaction, the organosilicon compound preferably has one or two kinds of an acryloyl group and a methacryloyl group as the radical polymerizable functional group.

The alkoxysilyl group contained in the organosilicon compound may be present, for example, in the form of an alkoxysilane monomer, or may be bonded to the siloxane skeleton. Examples of the siloxane skeleton include a partial structure included in a condensation product of an alkoxysilane such as an alkoxysilane oligomer or an alkoxysilane polymer, a silsesquioxane that has a cage structure, a silsesquioxane that has a ladder structure, and a silsesquioxane that has a random structure.

As the organosilicon compound, for example, an alkoxysilane having a radical polymerizable functional group, such as 3-(meth)acryloxypropyltrimethoxysilane, 3-(meth)acryloxypropyltriethoxysilane, and 3-(meth)acryloxypropylmethyldimethoxysilane, condensation products thereof, a silsesquioxane having a radical polymerizable functional group, and the like can be used. The molecular weight of the silsesquioxane can be appropriately selected from, for example, the range from several hundred to several tens of thousands. These organosilicon compounds may be used singly, or two or more thereof may be used in combination.

In addition, the organosilicon compound may have a fluoroalkyl group. As the fluoroalkyl group, for example, a fluoroalkyl group represented by the general formula $CF_3(CF_3)_nCH_3CH_3$— (where n is an integer of 0 or more) can be employed. Examples of the fluoroalkyl group include a 3,3,3-trifluoropropyl group, a 1H,1H,2H,2H-nonafluorohexyl group, a 1H,1H,2H,2H-tridecafluorooctyl group, and a 1H,1H,2H,2H-heptadecafluorodecyl group. The organosilicon compound may have, as the fluoroalkyl group, one kind of functional group selected from these functional groups, or may have two or more kinds of functional groups thereof
—Polymerizable Ester The film-forming component of the coating agent may further contain therein a polymerizable ester having a radical polymerizable functional group (excluding the organosilicon compound) in addition to the organosilicon compound. The polymerizable ester can be radically polymerized with radicals generated from a film-curing component to form an organic component in the coating film. In addition, the polymerizable ester can react with a radical polymerizable functional group contained in the organosilicon compound to bind to the organosilicon compound.

By blending the polymerizable ester in the coating agent, flexibility of the coating film can be further improved while the hardness of the coating film after cured is maintained. As a result, the adhesion between the substrate made of a resin and the coating film can be further improved.

When the polymerizable ester is contained in the coating agent, the content of the polymerizable ester is, in terms of mass ratio, preferably 0.1 times or more and 1000 times or less, more preferably 1 time or more and 100 times or less, still more preferably 1 time or more and 10 times or less, particularly preferably 1 time or more and 5 times or less, most preferably 2 times or more and 3 times or less the content of the organosilicon compound. In this case, the effect of improving the hardness by the inorganic component and the effect of improving the adhesion and the flexibility by the organic component can be achieved in a well-balanced manner.

As the polymerizable ester, an ester compound having a radical polymerizable functional group can be used. In this regard, it is noted that a compound containing a radical polymerizable functional group and an alkoxysilyl group in the molecular structure is treated as the organosilicon compound described above, and is excluded from the polymerizable ester.

As the radical polymerizable functional group contained in the polymerizable ester, the same functional group as the radical polymerizable functional group contained in the organosilicon compound described above can be employed. In addition, the radical polymerizable functional group contained in the polymerizable ester may be the same functional group as or a different functional group from the radical polymerizable functional group contained in the organosilicon compound.

More specifically, for example, monoesters such as methyl (meth)acrylate, ethyl (meth)acrylate, propyl (meth)acrylate, 1-methylethyl (meth)acrylate, butyl (meth)acrylate, 2-methylpropyl (meth)acrylate, 2-hydroxyethyl (meth)acrylate, and 2-hydroxypropyl (meth)acrylate; diesters such as 1,6-hexanediol di(meth)acrylate, polyethylene glycol di(meth)acrylate, and isocyanuric acid ethylene oxide-modified di(meth)acrylate; and esters having three or more acryloyl groups, such as trimethylolpropane tri(meth)acrylate, pentaerythritol tri(meth)acrylate, pentaerythritol tetra(meth)acrylate, and isocyanuric acid ethylene oxide-modified tri(meth)acrylate can be used as the polymerizable ester.

In the coating agent, these polymerizable esters may be used singly, or two or more kinds thereof may be used in combination. In addition, the polymerizable ester may be a monomer of the compound described above, or may be an oligomer obtained by polymerizing a plurality of monomers in advance.

The polymerizable ester preferably has two or more radical polymerizable functional groups per molecule. In this case, compounds having radical polymerizable functional groups can be easily polymerized with each other via the polymerizable ester. As a result, the hardness of the coating film can be further increased, and the durability against scratches can be further improved.

The polymerizable ester more preferably has three or more radical polymerizable functional groups per molecule. In this case, structural units derived from the polymerizable ester and structural units derived from the organosilicon compound can be polymerized into a network form. As a result, the hardness of the coating film can be still further increased, and the durability against scratches can be further improved.

The coating agent preferably satisfies the following condition ($\alpha$) or condition ($\beta$). More specifically, the coating agent may satisfy only the condition ($\alpha$) or only the condition ($\beta$). Alternatively, the coating agent may satisfy both the condition ($\alpha$) and the condition ($\beta$).

Condition ($\alpha$): the organosilicon compound and the polymerizable ester satisfy the relationships of formulas (I) and (II)

Condition ($\beta$): the organosilicon compound and the polymerizable ester satisfy the relationships of formulas (III) and (IV)

[Mathematical Formula 1]

$$32.946 \times (\gamma_{ester} - \gamma_{Si} - 16.7) < \frac{w_{Si}\eta_{Si} + w_{ester}\eta_{ester}}{w_{Si} + w_{ester}} + 331.2 < 32.946(\gamma_{ester} - \gamma_{Si} + 7.0) \quad (I)$$

[Mathematical Formula 2]

$$\frac{w_{Si}\eta_{Si} + w_{ester}\eta_{ester}}{w_{Si} + w_{ester}} > 200 \quad (II)$$

[Mathematical Formula 3]

$$\eta > -4.6003(\gamma_{ester} - \gamma_{Si}) + 219.4655 \quad (III)$$

[Mathematical Formula 4]

$$\gamma_{ester} - \gamma_{Si} > 37 \quad (IV)$$

In the formulas (I) to (IV), $\gamma_{Si}$ represents surface free energy (unit: mJ/cm$^2$) of the organosilicon compound, $\gamma_{ester}$ represents surface free energy (unit: mJ/cm$^2$) of the polymerizable ester, is, represents an absolute viscosity (unit: mPa·s) of the organosilicon compound at 60° C., $\eta_{ester}$ represents an absolute viscosity (unit: mPa·s) of the polymerizable ester at 60° C., $w_{Si}$ represents a content (unit: g) of the organosilicon compound, and $w_{ester}$ represents a content (unit: g) of the polymerizable ester, and $\eta$ in the formula (III) represents a mixed viscosity (unit: mPa·s) of the organosilicon compound and the polymerizable ester, represented by formula (V).

[Mathematical Formula 5]

$$\log(\log(\eta + 1)) = \sum_{i=Si,ester} \frac{w_i}{w_{Si} + w_{ester}}(\log(\log(\eta_i + 1))) \quad (V)$$

By using the organosilicon compound and polymerizable ester that satisfy the condition ($\alpha$) or the condition ($\beta$) in combination, the inorganic component produced by a sol-gel reaction can be segregated on the surface on the surface of the coating film in the process of curing the coating agent. As a result, a coating film can be formed such that the concentration of siloxane bonds becomes maximum at the outermost surface of the coating film. Due to such segregation of the inorganic component on the outermost surface of the coating film as described above, the durability of the coating film against scratches can be further enhanced.

The value of the left-hand side in the formula (II), that is, the weighted average of the absolute viscosity $\eta_{Si}$ of the organosilicon compound and the absolute viscosity $\eta_{ester}$ of the polymerizable ester, is preferably 1200 mPa·s or less, more preferably 1000 mPa·s or less, still more preferably 900 mPa·s or less.

The mixed viscosity $\eta$ of the organosilicon compound and polymerizable ester in the coating agent is preferably 1000 mPa·s or less, more preferably 600 mPa·s or less, still more preferably 500 mPa·s or less, particularly preferably 300 mPa·s or less. In addition, the mixed viscosity $\eta$ of the organosilicon compound and polymerizable ester in the coating agent is preferably 50 mPa·s or more. In addition, the difference $\gamma_{ester}-\gamma_{Si}$ between the surface free energy $\gamma_{ester}$ of the polymerizable ester and the surface free energy $\gamma_{Si}$ of the organosilicon compound in the coating agent is preferably 10 mJ/cm$^2$ or more and 37 mJ/cm$^2$ or less, preferably 15 mJ/cm$^2$ or more and 37 mJ/cm$^2$ or less, still more preferably 20 mJ/cm$^2$ or more and 37 mJ/cm$^2$ or less.

[Film-Curing Component]

The coating agent includes therein a film-curing component for allowing a reaction of curing the film-forming component to proceed. The film-curing component is composed so that both a base and a radical can be generated on irradiation with ultraviolet light. For example, the film-curing component may include therein a photobase generator composed so that both a base and a radical can be generated on irradiation with ultraviolet light. In addition, the film-curing component may include therein both a photobase generator composed so that a base can be generated on irradiation with ultraviolet light and a photoradical polymerization initiator composed so that a radical can be generated on irradiation with ultraviolet light.

—Nonionic Photobase Generator

The coating agent includes therein, as a film-curing component, 0.1 to 50 parts by mass of a nonionic photobase generator based on 100 parts by mass of the organosilicon compound. The photobase generator is composed so that at least a base can be generated on irradiation with ultraviolet light. The specific amount of the photobase generator is blended in the coating agent, thereby allowing a sol-gel reaction of the film-forming component to proceed to form an inorganic component in the coating film.

In addition, the photobase generator has no ionic bond in the molecular structure. More specifically, the atoms constituting the photobase generator are bonded to each other by covalent bonds. Thus, the photobase generator can curtail spontaneous liberation of the base in the dark. For this reason, by blending the photobase generator in the coating agent, the storage stability of the coating agent can be improved.

In the case where the content of the photobase generator is less than 0.1 parts by mass, the amount of the base generated from the photobase generator on irradiation with ultraviolet light may be insufficient. As a result, the coating agent may not be sufficiently cured so that the reduction in the hardness of the coating film may be caused. By adjusting the content of the photobase generator in the coating agent to be 0.1 parts by mass or more, preferably 1 part by mass or more, more preferably 5 parts by mass or more each based on 100 parts by mass of the organosilicon compound, such a problem can be easily avoided.

From the viewpoint of further accelerating curing of the coating agent, it is preferable to increase the content of the photobase generator. When the content of the photobase generator is excessively increased, however, the amount of ultraviolet light absorbed into the photobase generator will be increased. As a result, when the coating agent is irradiated with ultraviolet light, the amount of ultraviolet light that reaches deeply into the coating agent may be insufficient. Furthermore, depending on the amount of the photobase generator, the base generated from the photobase generator may serve as a catalyst to accelerate hydrolysis of the resin of the substrate. From the viewpoint of avoiding these problems, the content of the photobase generator is 50 parts by mass or less based on 100 parts by mass of the organosilicon compound. From the same viewpoint, the content of the photobase generator is preferably 45 parts by mass or less, more preferably 30 parts by mass or less, still more preferably 20 parts by mass or less each based on 100 parts by mass of the organosilicon compound.

The photobase generator may be composed so that both a base and a radical can be generated on irradiation with ultraviolet light. In this case, when the coating agent is irradiated with ultraviolet light, a radical that serves as an initiation point for a radical polymerization reaction can be formed in the coating agent. Thus, the photobase generator composed so as to generate both a base and a radical solely allows both a sol-gel reaction and a radical polymerization reaction to proceed.

The photobase generator has, in the molecular structure, an ultraviolet light absorption moiety that absorbs ultraviolet light and a base moiety bonded to the ultraviolet light absorption moiety. The ultraviolet light absorption moiety has, for example, a structural unit containing an aromatic ring such as a benzene ring, a naphthalene ring, a phenanthrene ring, an anthracene ring, an anthraquinone ring, a xanthene ring, or a thioxanthene ring, and can generate a radical when absorbing ultraviolet light.

In addition, the base moiety includes, for example, a structural unit that serves as a base when desorbing from the ultraviolet light absorption moiety, such as primary to tertiary amino groups, a quaternary ammonium cation, a carbamoyl group, a carbamate bond, an imino bond, and a heterocyclic ring containing nitrogen. When the ultraviolet light absorption moiety absorbs ultraviolet light, the base moiety can desorb from the ultraviolet light absorption moiety to produce a base.

More specifically, examples of the photobase generator include (E)-N-(bis(dimethylamino)methylene)-3-(2-hydroxyphenyl)acrylamide and (E)-N-cyclohexyl-N-((E)-(cyclohexylimino)(piperidin-1-yl)methyl)-3-(2-hydroxyphenyl) acrylamide.

—Photoradical Polymerization Initiator

The film-curing component may include therein a photoradical polymerization initiator. The photoradical polymerization initiator is composed so that a radical can be generated on irradiation with ultraviolet light. By blending the photoradical polymerization initiator in the coating agent, the radical polymerization of the film-forming component can proceed to thereby form an organic component in the coating film.

In addition, the photoradical polymerization initiator has no ionic bond in the molecular structure. More specifically, the atoms constituting the photoradical polymerization initiator are bonded to each other by covalent bonds. Thus, the photoradical polymerization initiator can curtail formation of radicals in the dark. For this reason, by blending the photoradical polymerization initiator in the coating agent, the storage stability of the coating agent can be improved.

In the case where no radical can be generated from the photobase generator in the film-curing component, the content of the photoradical polymerization initiator is preferably 0.1 parts by mass or more and 50 parts by mass or less based on 100 parts by mass of the film-forming component. By adjusting the content of the photoradical polymerization initiator to be 0.1 parts by mass or more, the amount of the radical generated from the photoradical polymerization initiator can be sufficiently increased on irradiation with ultraviolet light. Thus, the coating agent can be easily cured. From the viewpoint of further accelerating the radical polymerization of the film-forming component, the content of the photoradical polymerization initiator is more preferably set to 1 part by mass or more, still more preferably set to 5 parts by mass or more each based on 100 parts by mass of the film-forming component.

From the viewpoint of further accelerating curing of the coating agent, it is preferable to increase the content of the photoradical polymerization initiator. When the content of the photoradical polymerization initiator is excessively increased, however, the amount of ultraviolet light absorbed into the photoradical polymerization initiator will be increased. As a result, when the coating agent is irradiated with ultraviolet light, the amount of ultraviolet light that reaches deeply into the coating agent may be insufficient. From the viewpoint of avoiding such a problem, the content of the photoradical polymerization initiator is preferably 50 parts by mass or less, more preferably 45 parts by mass or less, still more preferably 30 parts by mass or less, particularly preferably 20 parts by mass or less each based on 100 parts by mass of the film-forming component.

As the photoradical polymerization initiator, for example, an acetophenone-based compound, a benzophenone-based compound, an α-ketoester-based compound, a phosphine oxide-based compound, a benzoin compound, a titanocene-based compound, an acetophenone/benzophenone-hybrid-based photo initiator, an oxime ester-based photo polymerization initiator, camphorquinone, and the like can be used.

Examples of the acetophenone-based compound include 2,2-dimethoxy-1,2-diphenylethane-1-one, 1-hydroxycyclohexyl-phenyl-ketone, 2-hydroxy-2-methyl-1-phenylpropane-1-one, 1-[4-(2-hydroxyethoxy)-phenyl]-2-hydroxy-2-methyl-1-propane-1-one, 2-methyl-1-[4-(methylthio)phenyl]-2-morpholinopropane-1-one, 2-benzyl-2-dimethylamino-1-(4-morpholinophenyl)-butane-1-one, diethoxyacetophenone, oligo{2-hydroxy-2-methyl-1-[4-(1-methylvinyl)phenyl]propanone}, and 2-hydroxy-1-{4-[4-(2-hydroxy-2-methylpropionyl)benzyl]phenyl}-2-methylpropane-1-one.

Examples of the benzophenone-based compound include benzophenone, 4-phenylbenzophenone, 2,4,6-trimethylbenzophenone, and 4-benzoyl-4'-methyldiphenylsulfide. Examples of the α-ketoester-based compound include methyl benzoylformate, a 2-(2-oxo-2-phenylacetoxyethoxy) ethyl ester of an oxyphenyl acetic acid, and a 2-(2-hydroxyethoxy)ethyl ester of an oxyphenyl acetic acid.

Examples of the phosphine oxide-based compound include 2,4,6-trimethylbenzoyl diphenyl phosphine oxide, bis(2,4,6-trimethylbenzoyl)phenylphosphine oxide, and bis (2,6-dimethoxybenzoyl)-2,4,4-trimethylpentyl phosphine oxide. Examples of the benzoin compound include benzoin, benzoin methyl ether, benzoin ethyl ether, benzoin isopropyl ether, and benzoin isobutyl ether. Examples of the acetophenone/benzophenone-hybrid-based photo initiator include 1-[4-(4-benzoylphenylsulfanyl)phenyl]-2-methyl-2-(4-methylphenylsulfinyl)propane-1-one. Examples of the oxime ester-based photo polymerization initiator include 2-(O-benzoyloxime)-1-[4-(phenylthio)]-1,2-octanedione.

As the photoradical polymerization initiator, one kind of compound selected from these compounds may be used, or two or more kinds of compounds thereof may be used in combination.

—Other Additives

The coating agent may include therein, in addition to the organosilicon compound and the nonionic photobase generator as essential components, additives known for use in a coating agent to the extent that curing of the coating agent is not impaired. For example, the coating agent may include therein, as an additive, an additive for curtailing deterioration of a coating film, such as an ultraviolet absorber, a radical scavenger, and a hindered amine light stabilizer. By the use of these additives, the effect of improving the weatherability of a coating film can be expected.

In addition, the coating agent may include therein, as an additive, a surface conditioner such as a leveling agent and a defoaming agent. By use of these additives, the thickness of the coating agent applied onto the substrate can be made uniform. Therefore, in a resin member provided with the coating film, an effect of further improving the durability against scratches can be expected.

Further, the coating agent may include therein, an ionic photobase generator, that is, a photobase generator that has an anion and a cation bonded by an ionic bond, to the extent that the storage stability is not impaired. As described above, however, the ionic photobase generator generates a minute amount of base even in the dark, and thus, if the content of the ionic photobase generator is excessively increased, the storage stability of the coating agent may be decreased. From the viewpoint of avoiding reduction of the storage stability of the coating agent, the content of the ionic photobase generator is preferably less than 0.1 parts by mass, more preferably 0.01 parts by mass or less, based on 100 parts by mass of the film-forming component, and particularly preferably 0 parts by mass, that is, it is particularly preferable that the coating agent contains no ionic photobase generator.

By curing the coating agent, a transparent coating film can be formed on the substrate. Therefore, when the coating agent is applied to the surface of, for example, a transparent member for a window, that is, a member as a substitute for a window glass made of an inorganic material, a lightweight transparent member for window in comparison with a glass made of an inorganic material can be obtained.

In addition, the coating agent is applied to the surface of, for example, a body panel, thereby allowing a clear coat layer to be formed on the surface of the body panel. Furthermore, a colorant such as a pigment may also be added to the coating agent as appropriate to thereby color the coating film.

After the coating agent is applied onto the substrate made of a resin, the coating agent is cured by irradiation with ultraviolet light to thereby obtain a resin member. This resin member includes the substrate made of a resin, and a coating film made of a cured product of the coating agent and disposed on the surface of the substrate.

In addition, the coating film includes:

a structural unit derived from the radical polymerizable functional group; and a structural unit having a siloxane bond.

When the coating agent is irradiated with ultraviolet light, the base and radical generated from the film-curing component cause the radical polymerization and the sol-gel reaction to proceed in parallel as described above. Causing the radical polymerization and the sol-gel reaction to proceed in parallel as described above allows the formation of a coating film that is excellent in adhesion to the substrate and durability against scratches.

It is preferable that a concentration of the siloxane bonds in the coating film is maximum at the surface of the coating film. Because the inorganic component is segregated on the outermost surface of the coating film in such a way, the durability of the coating film against scratches can be further enhanced.

The concentration of the siloxane bonds in the coating film may become lower toward the substrate. More specifically, in the coating film, the concentration of the inorganic component may be continuously varied in the depth direction such that the concentration of the siloxane bonds is maximum at the outermost surface of the coating film, whereas the concentration of the inorganic component is minimum at the interface between the coating film and the substrate. In this case, the coating film can be kept from being peeled or fallen in a better way, as compared with a case where the inorganic component and the organic component are phase-separated.

For the resin member, the resin to constitute the substrate may be appropriately selected in accordance with the intended use of the resin member. For example, in the case of using the resin member as a transparent member for window, a polycarbonate resin can be employed for the substrate. The polycarbonate resin is excellent in various properties required for the transparent member for window, such as weatherability, strength, and transparency. Thus, by forming the transparent coating film on the substrate made of the polycarbonate resin, a resin member that is suitable as a transparent member for window can be obtained.

The resin member can be produced by, for example, a production method including:

a preparing step of preparing a substrate made of a resin;

a coating step of applying the coating agent on the surface of the substrate; and a curing step of irradiating the coating agent with ultraviolet light to form a coating film made of a cured product of the coating agent on the surface of the substrate.

In the production method, for the application of the coating agent in the coating step, an appropriate device can be selected for use from among known applying devices such as a spray coater, a flow coater, a spin coater, a dip coater, a bar coater, and an applicator, in accordance with the desired film thickness, the shape of the equipment, and the like.

After the coating step, a step of heating and then drying the coating agent may be performed, if necessary.

For the irradiation with ultraviolet light in the curing step, for example, an appropriate light source can be selected for use from among known light sources capable of generating ultraviolet light, such as a mercury lamp, a metal halide lamp, a light emitting diode, and an excimer lamp, in accordance with the absorption wavelengths, required amounts of light, and the like of the photobase generator and photoradical polymerization initiator. In addition, in the curing step, the coating agent may be irradiated with ultraviolet light in an air atmosphere, or irradiated with ultraviolet light in a nitrogen atmosphere. The coating agent can be irradiated with ultraviolet light, while being heated to accelerate the reaction, if necessary.

In addition, after the curing step, a step of heating the coating film to accelerate the curing may be performed, if necessary.

EXAMPLES

Examples of the coating agent will be described. It is noted that the coating agent, the resin member provided with the coating film, and the method for producing the resin member according to the present disclosure are not limited to the following aspects, and the configuration can be changed as appropriate as far as the gist of the present disclosure would not be impaired.

Here are the compounds used in the examples.
—Organosilicon Compound
PAS: condensation product of 3-(trimethoxysilyl)propyl acrylate (see structural formula (1))

[Chemical Formula 1]

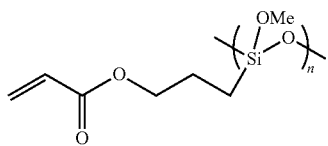

(1)

It is noted that n in the structural formula (1) is an integer of 1 or more. The weight average molecular weight of the PAS used in the examples is specifically 1400.

PMAS: poly 3-(trimethoxysilyl)propyl methacrylate (see structural formula (2))

[Chemical Formula 2]

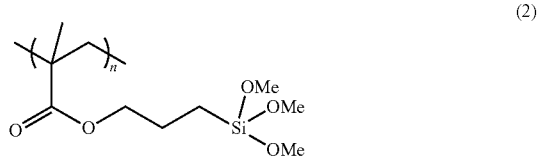

(2)

It is noted that n in the structural formula (2) is an integer of 1 or more.
—Polymerizable Ester
AHM: 3-acryloyloxy-2-hydroxypropyl methacrylate
—Nonionic Photobase Generator
Cou-TMG: (E)-N-(bis(dimethylamino)methylene)-3-(2-hydroxyphenyl)acrylamide (see structural formula (3))

It is noted that the nonionic photobase generator used in the examples is composed so that a base can be generated on irradiation with ultraviolet light. When the nonionic photobase generator used in the examples is irradiated with ultraviolet light, no radicals are generated.

[Chemical Formula 3]

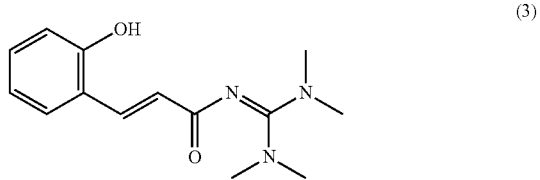

(3)

—Photoradical Polymerization Initiator
Omnirad 819 (photoradical polymerization initiator containing α-ketoester-based compound, manufactured by IGM Resins B.V.)
It is noted that "Omnirad" is a registered trademark of IGM Group B.V.
—Ionic Photobase Generator
XT-TMG: guanidinium (9-oxoxanthen-2-yl)ethanoate (see structural formula (4))

[Chemical Formula 4]

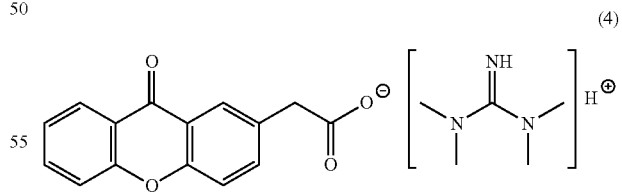

(4)

Example 1

The coating agent according to the present example includes: a film-forming component containing an organosilicon compound having a radical polymerizable functional group and an alkoxysilyl group; and a film-curing component composed so that a base and a radical can be generated on irradiation with ultraviolet light. The film-curing component contains a nonionic photobase generator having no ionic bond in the molecular structure. The content of the nonionic photobase generator is 0.1 parts by mass or more and 50 parts by mass or less based on 100 parts by mass of the organosilicon compound.

Hereinafter, more specific compositions of the coating agent according to the present example will be described. In the present example, three types of coating agents (Table 1: test agents 1 to 3) were prepared by dissolving PAS as an organosilicon compound, AHM as a polymerizable ester, Cou-TMG as a nonionic photobase generator, and Omnirad 819 as a photoradical polymerization initiator in chloroform at the mass ratios shown in Table 1. In the present example, test agent 4 shown in Table 1 was prepared for comparison with the test agents 1 to 3. A test agent 4 has the same composition as the test agents 1 to 3, except for containing no nonionic photobase generator.

TABLE 1

| | | Test Agent 1 | Test Agent 2 | Test Agent 3 | Test Agent 4 |
|---|---|---|---|---|---|
| Organosilicon Compound | Parts by Mass | 50 | 50 | 50 | 50 |
| Polymerizable Ester | Parts by Mass | 10 | 10 | 10 | 10 |
| Nonionic Photobase Generator | Parts by Mass | 1.25 | 2.5 | 5 | — |
| Photoradical Polymerization Initiator | Parts by Mass | 3 | 3 | 3 | 3 |

Next, on substrates made of a resin, coating films made of cured products of the test agents were formed to prepare resin members. The method for producing the resin members will be described in detail below.

First, a preparing step of preparing a substrate made of a resin was performed. In the present example, a plate material made of a polycarbonate resin with a thickness of 5 mm was prepared as the substrate.

Next, a coating step of applying a test agent on the surface of the substrate was performed. An applicator was used for the application of the test agent. In addition, according to the present example, the test agent was applied onto the substrate, and then, the substrate was heated at 60° C. for 10 minutes to perform pre-baking.

After the pre-baking, a curing step of irradiating the test agent with ultraviolet light to form a coating film made of a cured product of the test agent on the surface of the substrate was performed. In the present example, the irradiation with ultraviolet light was performed in a nitrogen atmosphere. In addition, as a light source for the ultraviolet light, a light emitting diode with a peak wavelength of 365 nm was used. In addition, the illuminance of the ultraviolet light was adjusted to be 30 mW/cm$^2$, and the exposure was adjusted to be 10800 mJ/cm$^2$.

After the irradiation with ultraviolet light, the coating film was heated at 100° C. for 10 minutes to perform post-baking. In this way, a test piece was obtained. The obtained test piece was clear and colorless. In addition, the thickness of the coating film formed on the substrate was about 50 μm.

Next, an infrared absorption spectrum of the coating film on the substrate was acquired by Fourier transform infrared absorption spectroscopy (FT-IR). FIG. 1 shows examples of infrared absorption spectra of the coating films prepared from the test agents 1 to 4. It is noted that the vertical axis of FIG. 1 represents absorbance, whereas the horizontal axis thereof represents wavenumber (cm$^{-1}$).

In the case of the infrared absorption spectra shown in FIG. 1, absorption peaks derived from the unreacted organosilicon compounds are known to appear around a wave number of 1140 cm$^{-1}$. According to FIG. 1, the absorbances of the absorption peaks derived from the organosilicon compounds in the cases of the infrared absorption spectra of the test agents 1 to 3 can be understood to be smaller than the absorbance of the absorption peak derived from the organosilicon compound in the case of the infrared absorption spectrum of the test agent 4. Accordingly, from these results, it is understood that by blending the nonionic photobase generator in the coating agent the sol-gel reaction of the organosilicon compound is caused to proceed. In particular, in the cases of the test agent 2 and the test agent 3 in which the content of the nonionic photobase generator is 5 parts by mass or more based on 100 parts by mass of the organosilicon compound, almost no absorption peaks derived from the unreacted organosilicon compounds are observed, and the organosilicon compounds are estimated to be almost completely reacted.

Example 2

In the present example, the hardness of a coating film was evaluated by the following method. Specifically, first, a plate material made of a polycarbonate resin with a thickness of 5 mm was prepared as the substrate. The test agent 2 shown in Table 1 was applied onto the surface of the substrate, and then, the substrate was heated at 60° C. for 10 minutes to perform pre-baking. After the pre-baking, the test agent 2 was irradiated with ultraviolet light under the same conditions as in Example 1 to form a coating film on the surface of the substrate.

After the irradiation with ultraviolet light was performed, the coating film was heated under the conditions shown in Table 2 to perform post-baking. In this way, test pieces A to D were obtained. The obtained test pieces were all clear and colorless. In addition, the thickness of the coating film formed on the substrate was about 50 μm.

With the use of the test pieces A to D thus obtained, the scratch hardness of the coating film was evaluated by the pencil method described in JIS K 5400. The scratch hardness of the coating film in each test piece was as shown in Table 2.

TABLE 2

| | Temperature of Post-baking (° C.) | Time of Post-baking (min) | Scratch Hardness |
|---|---|---|---|
| Test Piece A | Not Done | | 6H |
| Test Piece B | 60 | 5 | 7H |
| Test Piece C | 100 | 5 | 8H |
| Test Piece D | 140 | 5 | 8H to 9H |

As shown in Table 2, the test agent according to the present example made it possible to increase the scratch hardness as the temperature of the post-baking was increased.

Example 3

In this example, the storage stability of a coating agent was evaluated by the following method. First, 0.51 g of methanol was weighed in a vial. In this methanol, 0.10 g of the PMAS and 0.012 g of the Cou-TMG were dissolved to obtain a test agent 5. The ratio between PMAS and Cou-TMG in the test agent 5 is represented as PMAS:Cou-TMG=100:8 in molar ratio.

In the present example, a test agent 6 in which the XT-TMG as an ionic photobase generator was blended instead of the Cou-TMG was prepared for comparison with the test agent 5. For preparing the test agent 6, first, 0.50 g of methanol was weighed in a vial. In this methanol, 0.10 g of the PMAS and 0.013 g of the XT-TMG were dissolved to obtain the test agent 6. The ratio between PMAS and XT-TMG in the test agent 6 is represented as PMAS:XT-TMG=100:8 in molar ratio. It is noted that the test agent 5 and the test agent 6 were prepared in the dark.

Next, the test agents 5 and 6 in the vials were stored in a dark room at room temperature of 25° C., and the viscosities of the test agents in the vials were visually evaluated. As a result, the test agent 6 having the ionic photobase generator blended therein was increased in viscosity on the fourth day from the start of the storage, and it has been determined that the test agent 6 was gelled. In contrast, in the case of the test agent 5 having the nonionic photobase generator blended therein, no increase in viscosity was observed even after a lapse of 6 days from the start of the storage.

From these results, it can be understood that by blending the nonionic photobase generator in the coating agent, the storage stability of the coating agent can be improved.

Example 4

In the present example, coating agents (test agents 7 to 10) with the compositions shown in Table 3 were prepared, and the coating agents were evaluated for storage stability and curability. Here are the specific structures of the organosilicon compound, polymerizable ester, and nonionic photobase generator used in the present example:

—Organosilicon Compound
  PTSA: condensation product of 3-(trimethoxysilyl)propyl acrylate (see general formula (5))

[Chemical Formula 5]

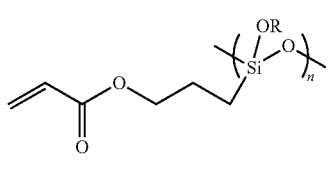

(5)

R = H, Me, Si≡ where n in the structural formula (5) is an integer of 1 or more. The weight average molecular weight of the PTSA used in the present example is specifically $3.5 \times 10^4$.

—Polymerizable Ester
  TMPTA: trimethylolpropane triacrylate
—Nonionic Photobase Generator
  Cou-DCMC: (E)-N-cyclohexyl-N-((E)-(cyclohexylimino)(piperidin-1-yl)methyl)-3-(2-hydroxyphenyl)acrylamide (see structural formula (6))

[Chemical Formula 6]

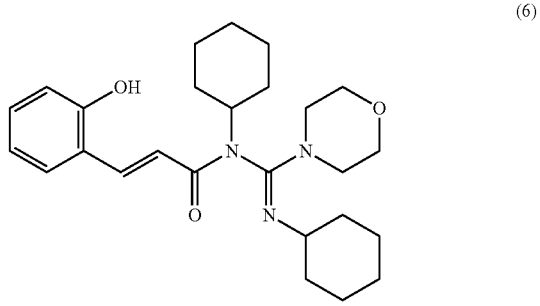

(6)

In the present example, four types of coating agents (test agents 7 to 10) were prepared by dissolving PTSA as an organosilicon compound, TMPTA as a polymerizable ester, Cou-DCMC as a nonionic photobase generator, and Omnirad 819 as a photoradical polymerization initiator in methanol at the ratios by mass shown in Table 3. It is noted that the amount of the methanol was adjusted to be 180 parts by mass based on 100 parts by mass of the total of the PTSA and TMPTA. In addition, the test agents were prepared in the dark.

In the present example, a test agent 11 shown in Table 3 was prepared for comparison with the test agents 7 to 10. The test agent 11 has the same composition as the test agent 7, except for containing no nonionic photobase generator.

TABLE 3

|  |  |  | Test Agent 7 | Test Agent 8 | Test Agent 9 | Test Agent 10 | Test Agent 11 |
| --- | --- | --- | --- | --- | --- | --- | --- |
| Organosilicon Compound | PTSA | Parts by Mass | 50 | 50 | 50 | 50 | 50 |
| Polymerizable Ester | TMPTA | Parts by Mass | 50 | 50 | 50 | 50 | 50 |
| Nonionic Photobase Generator | Cou-DCMC | Parts by Mass | 3 | 1 | 2 | 3 | — |
| Photoradical Polymerization Initiator | Omnirad819 | Parts by Mass | 10 | 3 | 3 | 3 | 10 |

<Storage Stability>

Vials containing test agents 7 to 10 were stored in the dark at room temperature of 25° C., and the viscosities of the test agents in the vials were visually evaluated. As a result, in each case of the test agents 7 to 10, no increase in viscosity was observed even after a lapse of 6 days from the start of the storage. From these results, it can be understood that the storage stability of the coating agent can be improved even in the case of using the nonionic photobase generator according to the present example.

<Curability>

For the evaluation of curability, the test agents 7 and 11 were used. First, the test agent 7 was applied by spin coating onto a substrate made of a polycarbonate resin. The substrate with the test agent 7 applied thereto was subjected to pre-baking by heating the substrate at 60° C. for 10 minutes, thereby providing a test piece E. Separately therefrom, the test agent 11 was applied by spin coating onto a substrate made of a polycarbonate resin. The substrate with the test agent 11 applied thereto was subjected to pre-baking by heating the substrate at 60° C. for 10 minutes, thereby providing a test piece F.

After the pre-baking, a curing step of irradiating the test pieces E and F with ultraviolet light to form coating films made of cured products of the test agents on the surfaces of the substrates was performed. According to the present example, the irradiation with ultraviolet light was performed in a nitrogen atmosphere. In addition, as a light source for the ultraviolet light, a light emitting diode with a peak wavelength of 365 nm was used. The illuminance of the ultraviolet light was adjusted to be 30 mW/cm$^2$, and the exposure was adjusted to be 9000 mJ/cm$^2$.

Next, the test pieces E and F were heated to perform pre-baking on the coating films. The post-baking according to the present example includes a first heating step of heating the coating films at a temperature of 60° C. for 10 minutes, a second heating step of heating the coating films at a temperature of 100° C. for 10 minutes, and a third heating step of heating the coating films at a temperature of 140° C. for 10 minutes. For each of the test pieces E and F subjected to the post-baking, the coating film was 30 to 40 µm in thickness, and was visually colorless and transparent. In addition, when the light transmittance of the coating film provided with the test piece E in the visible light region was measured, the light transmittance of the coating film was 96%.

Next, infrared absorption spectra of the film of the test agent 7 and of the film of the test agent 11 were acquired with the use of the test pieces E and F subjected to the pre-baking. For each infrared absorption spectrum, the peak intensity of the absorption peak at a wave number of 1118 cm$^{-1}$ derived from the siloxane bond was divided by the peak intensity of the absorption peak at a wave number of 1729 cm$^{-1}$ derived from the carbonyl group to calculate the peak intensity ratio of the absorption peak of the siloxane bond to the absorption peak derived from the carbonyl group. Then, the peak intensity ratio calculated based on the infrared absorption spectrum of the film of the test agent 7 is divided by the peak intensity ratio calculated based on the infrared absorption spectrum of the film of the test agent 11 to calculate the normalized intensity of the absorption peak derived from the siloxane bond in the prebaked test piece E.

The foregoing operation was similarly performed for the test pieces in each stage after the irradiation with ultraviolet light: after the first heating step in the post-baking; after the second heating step; and after the third heating step, thereby calculating the normalized intensity of the absorption peak derived from the siloxane bond in the test piece E in each stage.

Figure 2:
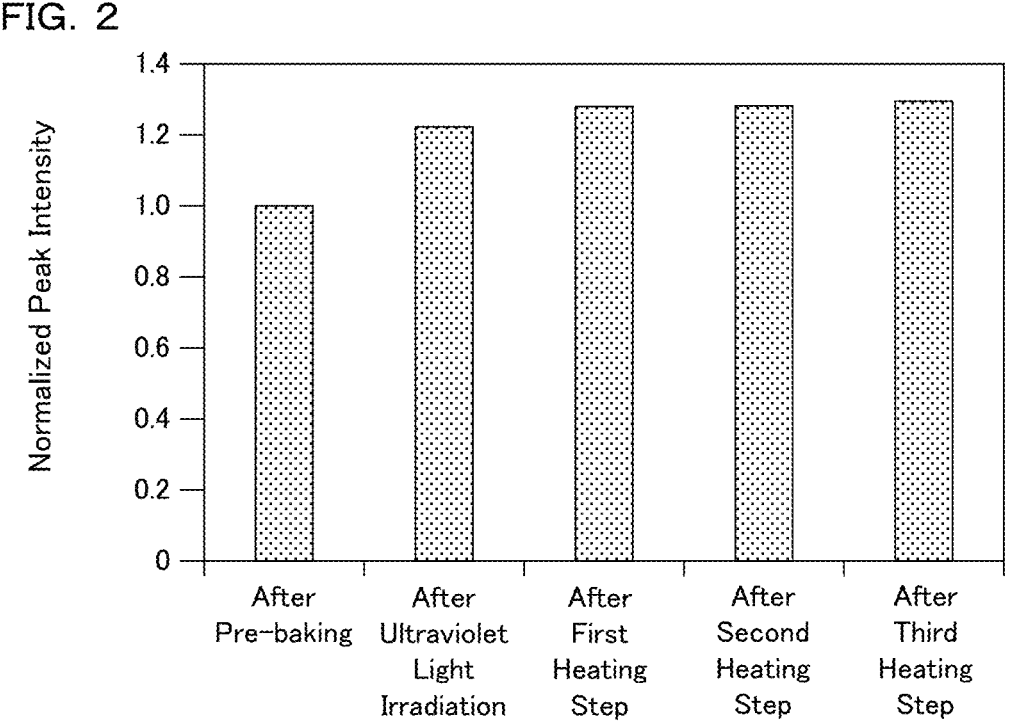
FIG. 2 is an explanatory diagram showing variations in the intensity of an absorption peak derived from a siloxane bond in Example 4.

FIG. 2 shows the normalized intensity of the absorption peak derived from the siloxane bond in the test piece E in each stage. It is noted that the vertical axis in FIG. 2 represents the normalized intensity of the absorption peak derived from the siloxane bond, which was calculated by the method described above.

As shown in FIG. 2, in the case of the coating film prepared using the test agent 7 containing the nonionic photobase generator, the normalized intensity of the absorption peak derived from the siloxane bond after the irradiation with ultraviolet light was about 1.2 times as high as that before the irradiation with ultraviolet light. In addition, while the normalized intensity of the absorption peak derived from the siloxane bond was increased also in each heating step of the post-baking, the rate of the increase was lower than that at the time of the irradiation with ultraviolet light. From these results, the irradiation with ultraviolet light can be understood to cause the sol-gel reaction to proceed sufficiently also in the test agent 7.

Example 5

In the present example, an inorganic component in a coating film was evaluated for distribution. Specifically, a test agent 8 was applied by spin coating onto a substrate made of a polycarbonate resin. The substrate with the test agent 8 applied thereto was subjected to pre-baking by heating the substrate at 60° C. for 40 minutes to dry the test agent 8. After the pre-baking, the test agent 8 on the substrate was irradiated with ultraviolet light to obtain a test piece G including the substrate and a coating film made of a cured product of the test agent 8 and provided on the substrate. It is noted that the conditions for the irradiation with ultraviolet light are the same as those in Example 4.

In addition, in the present example, 50 parts by mass of PTSA, 50 parts by mass of TMPTA, 3.0 parts by mass of Cou-TMG, and 10 parts by mass of Omnirad 819 were dissolved in carbon tetrachloride to prepare a test agent 12. It is to be noted that the amount of substance (number of moles) of the Cou-TMG in the test agent 12 is equal to the amount of substance of the Cou-DCMC in the test agent 8.

The test agent 12 was applied by spin coating onto a substrate made of a polycarbonate resin. Then, the substrate having the test agent 12 applied thereto was subjected to pre-baking by heating the substrate at 60° C. for 40 minutes, and then irradiated with ultraviolet rays to obtain a test piece H including the substrate and a coating film made of a cured product of the test agent 12 and provided on the substrate. It is noted that the conditions for the irradiation with ultraviolet light are the same as those in Example 4.

Figure 3:
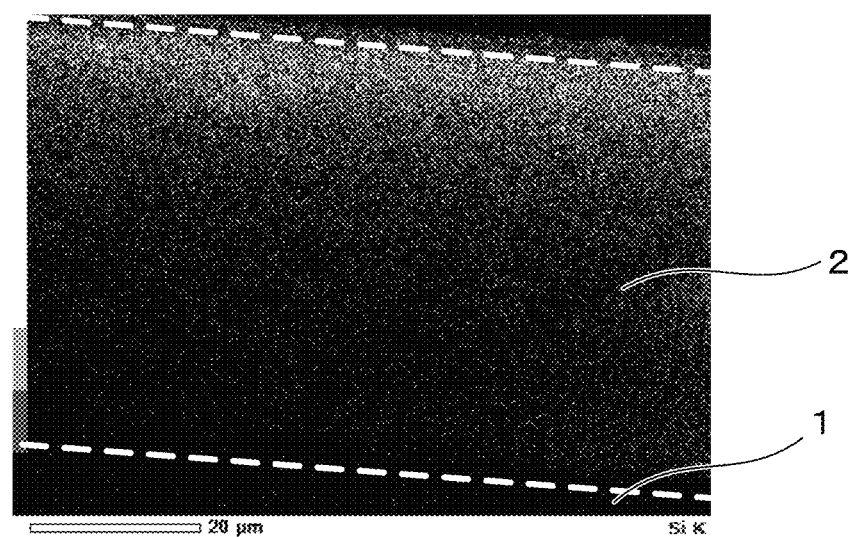
FIG. 3 is an explanatory diagram showing the distribution of Si atoms at a cross section of a test piece G in Example 5.
Figure 4:
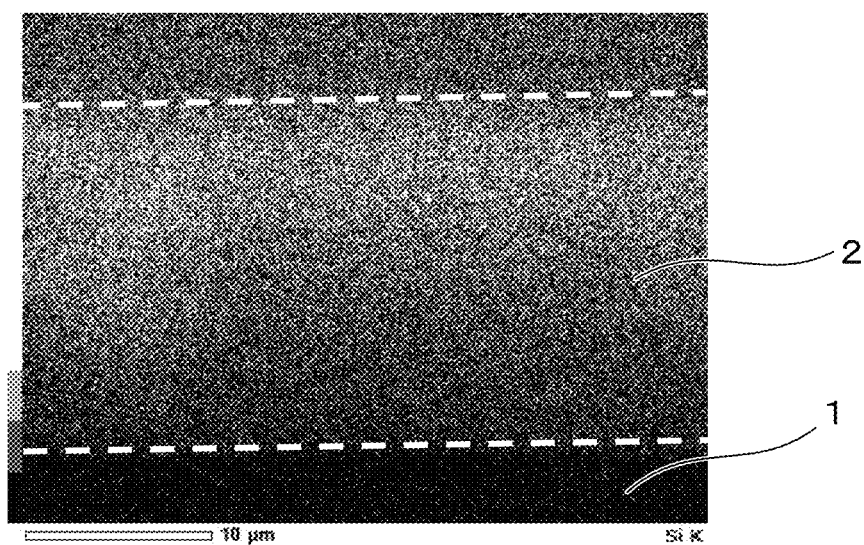
FIG. 4 is an explanatory diagram showing the distribution of Si atoms at a cross section of a test piece H in Example 5.

Next, cross sections of the coating films in the test piece G and the test piece H were observed using a scanning electron microscope, and the distributions of Si atoms in the cross sections of the coating films were evaluated by energy dispersive X-ray analysis. FIG. 3 shows the distribution of Si atoms in the cross section of the coating film of the test piece G, and FIG. 4 shows the distribution of Si atoms in the cross section of the coating film of the test piece H. It is noted that the lightness in FIGS. 3 and 4 indicates the presence of Si atoms, and a part with a smaller number of Si atoms is darker, whereas a part with a larger number of Si atoms is brighter.

As shown in FIGS. 3 and 4, the coating films 2 of the test pieces G and H have almost no Si atoms in the vicinities of the interfaces between the coating films 2 and the substrates 1, and have more Si atoms toward the outermost surfaces of the coating films 2. From these results, it can be understood that the inorganic components produced by the sol-gel reactions are segregated in the vicinities of the surfaces of the coating films 2 in the test pieces G and H.

In addition, from the comparison between FIGS. 3 and 4, it can be understood that the test agent 8 containing the Cou-DCMC as a nonionic photobase generator allows the segregation of the inorganic component more on the outermost surface of the coating film as compared with the test agent 12 containing the Cou-TMG. As described above, by increasing concentration of the inorganic component on the outermost surface of the coating film, it can be expected that the effects such as an improvement in hardness and abrasion resistance of the coating film, which are to be obtained by the segregation of the inorganic component, are further enhanced.

Example 6

In the present example, combination of the organosilicon compound and the polymerizable ester was variously changed to prepare coating agents, and the distribution of the inorganic component in the coating film prepared from each coating agent was evaluated. The compounds used in the present example will be described below.

—Organosilicon Compound

PTSA: condensation product of 3-(trimethoxysilyl)propyl acrylate

Further, here is the method for synthesizing the PTSA used in the present example. First, 100 mmol of 3-(trimethoxysilyl) propyl acrylate (hereinafter, referred to as "TSA") and 1000 mmol of dried methanol are put in a flask, and the contents are stirred for 10 minutes while the flask is cooled in an ice bath. After removing the flask from the ice bath, 200 mmol of water and 30 mmol of hydrochloric acid are added into the flask. After stirring the contents of the flask for 10 minutes under room temperature, the contents in the flask are stirred for 10 minutes on warming to 70° C. in a nitrogen atmosphere to condense the TSA.

After the stirring has been completed, 7.5 mL of tetrahydrofuran and 300 mL of cyclohexane are added into the flask to reprecipitate the PTSA. Thereafter, the solvent and by-products in the flask are removed, and thus the PTSA can be obtained.

P(TSA-TFS): condensation product of 3-(trimethoxysilyl) propyl acrylate and trimethoxy(3,3,3-trifluoropropyl)silane (see structural formula (7))

[Chemical Formula 7]

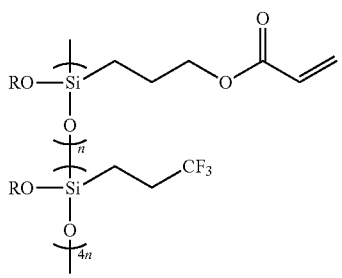

(7)

R = H, Me, Si≡ where n in the structural formula (7) is an integer of 1 or more. Here is the method for synthesizing the P(TSA-TFS) used in the present example.

First, 20 mmol of the TSA, 80 mmol of trimethoxy (3,3,3-trifluoropropyl)silane (hereinafter, referred to as "TFS"), and 1000 mmol of dried methanol are put in a flask, and the contents are stirred for 10 minutes while the flask is cooled in an ice bath. After removing the flask from the ice bath, 200 mmol of water and 30 mmol of hydrochloric acid are added into the flask. After stirring the contents of the flask for 20 minutes under room temperature, the contents in the flask are stirred for 10 minutes on warming to 70° C. in a nitrogen atmosphere to condense the TSA and the TFS.

After the stirring has been completed, 8.0 mL of tetrahydrofuran and 320 mL of cyclohexane are added into the flask to reprecipitate the P(TSA-TFS). Thereafter, the solvent and by-products in the flask are removed, and thus the P(TSA-TFS) can be obtained.

P(TSA-TFTS): condensation product of 3-(trimethoxysilyl)propyl acrylate and 1H,1H,2H,2H-tridecafluoro-n-octyltrimethoxysilane (see structural formula (8))

[Chemical Formula 8]

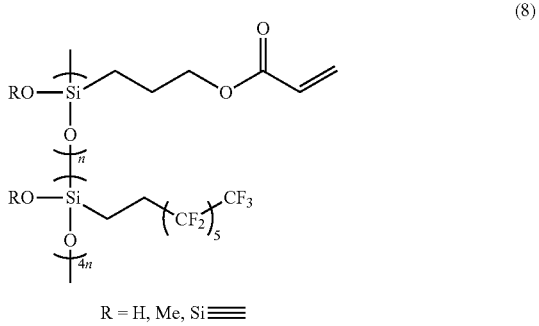

(8)

R = H, Me, Si≡

It is noted that n in the structural formula (8) is an integer of 1 or more. Here is the method for synthesizing the P(TSA-TFTS) used in the present example.

First, 4.0 mmol of the TSA, 16 mmol of 1H,1H,2H,2H-tridecafluoro-n-octyltrimethoxysilane (hereinafter, referred to as "TFTS"), and 400 mmol of dried methanol are put in a flask, and the contents are stirred for 10 minutes while the flask is cooled in an ice bath. After removing the flask from the ice bath, 40 mmol of water and 12 mmol of hydrochloric acid are added into the flask. After stirring the contents of the flask for 20 minutes under room temperature, the contents in the flask are stirred for 10 minutes on warming to 70° C. in a nitrogen atmosphere to condensate the TSA and the TFTS.

After the stirring has been completed, 7.5 mL of tetrahydrofuran and 400 mL of cyclohexane are added into the flask to reprecipitate the P(TSA-TFTS). Thereafter, the solvent and by-products in the flask are removed, and thus the P(TSA-TFTS) can be obtained.

P(TSA-PFPS): condensation product of 3-(trimethoxysilyl)propyl acrylate and 3-(pentafluorophenyl)propyltrimethoxysilane (see structural formula (9))

[Chemical Formula 9]

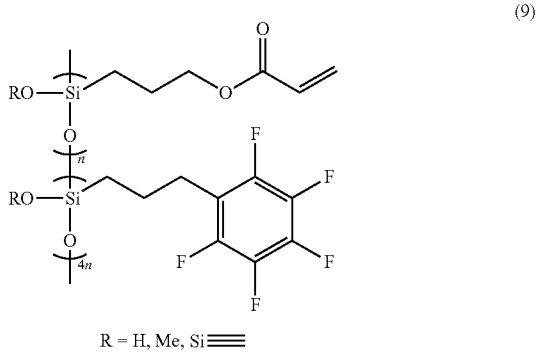

(9)

R = H, Me, Si≡

It is noted that n in the structural formula (9) is an integer of 1 or more. Here is the method for synthesizing the P(TSA-PFPS) used in the present example.

First, 4.0 mmol of the TSA, 16.0 mmol of 3-(pentafluorophenyl)propyltrimethoxysilane (hereinafter, referred to as "PFPS"), and 400 mmol of dried methanol are put in a flask, and the contents are stirred for 10 minutes while the flask is cooled in an ice bath. After removing the flask from the ice bath, 40 mmol of water and 12 mmol of hydrochloric acid are added into the flask. After stirring the contents of the flask for 20 minutes under room temperature, the contents in the flask are stirred for 10 minutes on warming to 70° C. in a nitrogen atmosphere to condensate the TSA and the PFPS.

After the stirring has been completed, 7.5 mL of tetrahydrofuran and 400 mL of cyclohexane are added into the flask to reprecipitate the P(TSA-PFPS). Thereafter, the solvent and by-products in the flask are removed, and thus the P(TSA-PFPS) can be obtained.

—Polymerizable Ester
  PETTA: pentaerythritol tetraacrylate
  TMPTA: trimethylolpropane triacrylate
  NGD: nonamethylene glycol diacrylate
  AHM: allyloxyhydroxypropyl methacrylate
  BZA: benzyl acrylate
  PET3A: pentaerythritol triacrylate
—Other Silicon-Containing Compounds
  MTPD R18: methacryloxypropyl-terminated polydimethylsiloxane (weight average molecular weight: 4500 to 5500, AZmax.co "DMS-R18")
  MTPD R22: methacryloxypropyl-terminated polydimethylsiloxane (weight average molecular weight: 10000, AZmax.co "DMS-R22")

It is noted that the MTPD R18 and the MTPD R22 have no alkoxysilyl group.

Table 4 shows the absolute viscosity at 60° C. (unit: mPa·s) and surface free energy (unit: mJ/cm$^2$) for each of the above-described compounds. It is noted that for the measurement of the absolute viscosity of each compound, a rotational viscometer ("ViscoQC 300" manufactured by Anton Paar GmbH) was used, with the rotation speed of the rotor set such that the resistance applied to the spindle was 10% or more of the maximum torque. The rotation speed of the rotor in the measurement of the absolute viscosity was specifically as shown in Table 4. In addition, the surface free energy of each compound has a value calculated based on the acid-base theory for the polymerizable ester having a hydroxyl group (—OH) in the molecular structure, and has values calculated based on the Owens-Wendt's theory for the organosilicon compound, the silicon-containing compound other than the organosilicon compound, and the polymerizable ester having no hydroxyl group (—OH).

Here is the method for preparing the coating agent. First, the organosilicon compound or silicon-containing compound and polymerizable ester shown in Tables 5 and 6 are added to a carbon tetrachloride as a solvent. The amounts of the organosilicon compound or silicon-containing compound, and polymerizable ester added are each 50% by mass, based on the solvent. Furthermore, 3% by mass of the photoradical polymerization initiator ("Omnirad 819" manufactured by IGM Resins B.V.) based on the total of the organosilicon compound or silicon-containing compound, and polymerizable ester is added into the solvent, and mixed, thereby allowing the preparation of the coating agents (test agents 13 to 37) shown in Table 5 and the coating agents (test agents 38 to 48) shown in Table 6. It is noted that the test agents 28 to 37 shown in Table 5 and the test agents 47 to 48 shown in Table 6 are examples of using a silicon-containing compound having no alkoxysilyl group instead of the organosilicon compound.

In the present example, each test agent was applied by spin coating onto a substrate made of a polycarbonate resin, and then, the substrate was subjected to pre-baking by heating the substrate to 60° C. It is noted that the heating time in the pre-baking was 40 minutes or shorter.

After the pre-baking, a curing step of irradiating the test agent with ultraviolet light to form a coating film made of a cured product of the test agent on the surface of the substrate was performed. According to the present example, the irradiation with ultraviolet light was performed in a nitrogen atmosphere. In addition, as a light source for the ultraviolet light, a light emitting diode with a peak wavelength of 365 nm was used. In addition, the illuminance of the ultraviolet light was adjusted to be 30 mW/cm$^2$, and the exposure was adjusted to be 7200 mJ/cm$^2$. In this way, a resin member with a coating film made of a cured product of the coating agent on the substrate was obtained.

Next, the distribution of the inorganic component in the coating film was evaluated by the following method. First, the surface of the coating film was observed with the use of a scanning secondary electron microscope equipped with an energy dispersive X-ray analyzer (that is, SEM-EDX) to acquire a secondary electron image of the surface, a mapping image of carbon atoms, and a mapping image of silicon atoms. Next, the resin member was cut to expose a cross section of the coating film. Then, a secondary electron image of the cross section of the coating film, a mapping image of carbon atoms, and a mapping image of silicon atoms were acquired with the use of SEM-EDX.

If a region with silicon atoms in higher concentration and a region with silicon atoms in lower concentration were formed at the surface of the coating film, it was determined that the coating film had a phase separation structure such as a sea-island structure or a sea-sea structure. Alternatively, if silicon atoms were uniformly distributed at both the surface and cross section of the coating film, it was determined that the coating film had a uniform structure. Further, it was determined that silicon atoms were uniformly distributed at the surface of the coating film, and it was determined that the inorganic component was segregated in the vicinity of the surface of the coating film at the cross section. The distributions of the inorganic components in the coating films prepared from the respective test agents were as shown in Tables 5 and 6.

TABLE 4

|  | Names of Compounds | Absolute Viscosity at 60(° C.) (mPa·s) | Rotation Speed of Rotor (rpm) | Surface Free Energy (mJ/cm²) |
|---|---|---|---|---|
| Organosilicon Compound | PTSA | 680.0 | 5 | 39.4 |
|  | P(TSA-TFS) | 1703.0 | 5 | 23.9 |
|  | P(TSA-TFTS) | 600.4 | 5 | 11.4 |
|  | P(TSA-PFPS) | 313.8 | 5 | 38.4 |

TABLE 4-continued

|  | Names of Compounds | Absolute Viscosity at 60(° C.) (mPa·s) | Rotation Speed of Rotor (rpm) | Surface Free Energy (mJ/cm²) |
|---|---|---|---|---|
| Other Silicon-containing Compounds | MTPD R18 | 37.1 | 200 | 34.6 |
|  | MTPD R22 | 80.7 | 100 | 31.0 |
| Polymerizable Ester | PETTA | 53.3 | 200 | 60.1 |
|  | TMPTA | 14.5 | 250 | 60.5 |
|  | NGD | 3.8 | 250 | 52.9 |
|  | AHM | 8.7 | 250 | 48.6 |
|  | BZA | 1.7 | 250 | 47.3 |
|  | PET3A | 45.0 | 250 | 48.7 |

TABLE 5

|  | Silicon-containing Compounds |  |  | Polymerizable Ester |  |  | Weighted Averages of Absolute Viscosities (mPa·s) | Mixed Viscosity η (mPa·s) | Difference between Surface Free Energies | Distribution of Inorganic Component |
|---|---|---|---|---|---|---|---|---|---|---|
|  | Names of Compounds | $\eta_{Si}$ (mPa·s) | $\gamma_{Si}$ (mJ/cm²) | Names of Compounds | $\eta_{ester}$ (mPa·s) | $\gamma_{ester}$ (mJ/cm²) |  |  |  |  |
| Test Agent 13 | PTSA | 680 | 39.4 | PETTA | 83.3 | 80.1 | 366.6 | 163.7 | 20.7 | Segregated |
| Test Agent 14 | PTSA | 680 | 39.4 | TMPTA | 14.5 | 80.5 | 347.3 | 67.7 | 21.1 | Segregated |
| Test Agent 15 | PTSA | 680 | 39.4 | NGD | 3.8 | 52.9 | 341.9 | 23.4 | 13.5 | Uniform |
| Test Agent 16 | PTSA | 680 | 39.4 | AHM | 8.3 | 48.8 | 344.4 | 46.1 | 9.2 | Uniform |
| Test Agent 17 | PTSA | 680 | 39.4 | BZA | 1.7 | 47.3 | 340.8 | 11.7 | 7.9 | Uniform |
| Test Agent 18 | P(TSA-TFS) | 1703 | 23.9 | PETTA | 53.3 | 80.1 | 878.1 | 232.0 | 36.2 | Segregated |
| Test Agent 19 | P(TSA-TFS) | 1703 | 23.9 | TMPTA | 14.5 | 80.5 | 858.8 | 90.6 | 36.8 | Segregated |
| Test Agent 20 | P(TSA-TFS) | 1703 | 23.9 | NGD | 3.8 | 52.9 | 853.4 | 29.3 | 29 | Phase-separated |
| Test Agent 21 | P(TSA-TFS) | 1703 | 23.9 | AHM | 8.7 | 48.8 | 855.9 | 80.3 | 24.7 | Uniform |
| Test Agent 22 | P(TSA-TFS) | 1703 | 23.9 | BZA | 1.7 | 47.3 | 852.3 | 14.0 | 23.4 | Uniform |
| Test Agent 23 | P(TSA-TFTS) | 600.4 | 11.4 | PETTA | 53.3 | 80.1 | 326.8 | 155.9 | 48.7 | Phase-separated |
| Test Agent 24 | P(TSA-TFTS) | 600.4 | 11.4 | TMPTA | 14.5 | 80.5 | 307.5 | 65.0 | 49.1 | Phase-separated |
| Test Agent 25 | P(TSA-TFTS) | 600.4 | 11.4 | NGD | 3.8 | 52.9 | 202.1 | 22.7 | 41.5 | Phase-separated |
| Test Agent 26 | P(TSA-TFTS) | 600.4 | 11.4 | AHM | 8.7 | 48.8 | 304.6 | 44.4 | 37.2 | Phase-separated |
| Test Agent 27 | P(TSA-TFTS) | 600.4 | 11.4 | BZA | 1.7 | 47.3 | 301.0 | 11.3 | 35.9 | Phase-separated |
| Test Agent 28 | MTPD R18 | 37.1 | 34.6 | PETTA | 53.3 | 80.1 | 45.2 | 44.3 | 25.5 | Phase-separated |
| Test Agent 29 | MTPD R18 | 37.1 | 34.6 | TMPTA | 14.5 | 80.5 | 25.8 | 22.6 | 25.9 | Phase-separated |
| Test Agent 30 | MTPD R18 | 37.1 | 34.6 | NGD | 3.8 | 52.9 | 20.4 | 9.9 | 18.3 | Phase-separated |
| Test Agent 31 | MTPD R18 | 37.1 | 34.6 | AHM | 8.7 | 48.8 | 22.9 | 16.8 | 14 | Phase-separated |
| Test Agent 32 | MTPD R18 | 37.1 | 34.6 | BZA | 1.7 | 47.3 | 19.4 | 5.7 | 12.7 | Phase-separated |
| Test Agent 33 | MTPD R22 | 80.7 | 31 | PETTA | 53.3 | 80.1 | 87.0 | 65.2 | 29.1 | Phase-separated |
| Test Agent 34 | MTPD R22 | 80.7 | 31 | TMPTA | 14.5 | 80.5 | 47.6 | 31.3 | 29.5 | Phase-separated |
| Test Agent 35 | MTPD R22 | 80.7 | 31 | NGD | 3.8 | 52.9 | 42.2 | 12.8 | 21.9 | Phase-separated |
| Test Agent 36 | MTPD R22 | 80.7 | 31 | AHM | 8.7 | 48.8 | 44.7 | 22.7 | 17.6 | Phase-separated |
| Test Agent 37 | MTPD R22 | 80.7 | 31 | BZA | 1.7 | 47.3 | 41.2 | 7.0 | 16.3 | Phase-separated |

TABLE 6

| | Silicon-containing Compounds | | | Polymerizable Ester | | | Weighted Averages of Absolute | Mixed | Difference between Surface | Distribution |
|---|---|---|---|---|---|---|---|---|---|---|
| | Names of Compounds | $\eta_{Si}$ (mPa·s) | $\gamma_{Si}$ (mJ/cm$^2$) | Names of Compounds | $\eta_{ester}$ (mPa·s) | $\gamma_{ester}$ (mJ/cm$^2$) | Viscosities (mPa·s) | Viscosity $\eta$ (mPa·s) | Free Energies | of Inorganic Component |
| Test Agent 38 | PTSA | 680 | 39.4 | PET3A | 45.0 | 48.7 | 362.5 | 147.1 | 9.3 | Uniform |
| Test Agent 39 | P(TSA-TFS) | 1703 | 23.9 | PET3A | 45.0 | 48.7 | 874.0 | 207.0 | 24.8 | Segregated |
| Test Agent 40 | P(TSA-TFTS) | 800.4 | 11.4 | PET3A | 45.0 | 48.7 | 322.7 | 140.2 | 37.3 | Phase-separated |
| Test Agent 41 | P(TSA-TFTS) | 313.8 | 38.4 | PETTA | 53.3 | 80.1 | 183.5 | 119.6 | 21.7 | Uniform |
| Test Agent 42 | P(TSA-TFTS) | 313.8 | 38.4 | TMPTA | 14.5 | 80.5 | 184.2 | 52.1 | 22.1 | Uniform |
| Test Agent 43 | P(TSA-TFTS) | 313.8 | 38.4 | NGD | 3.8 | 52.9 | 158.8 | 19.1 | 14.5 | Uniform |
| Test Agent 44 | P(TSA-TFTS) | 313.8 | 38.4 | AHM | 8.7 | 48.6 | 151.3 | 36.3 | 10.2 | Uniform |
| Test Agent 45 | P(TSA-TFTS) | 313.8 | 38.4 | BZA | 1.7 | 47.3 | 187.7 | 9.8 | 8.9 | Uniform |
| Test Agent 46 | P(TSA-TFTS) | 313.8 | 38.4 | PET3A | 45.0 | 48.7 | 179.4 | 108.2 | 10.3 | Uniform |
| Test Agent 47 | MTPD R18 | 37.1 | 34.5 | PET3A | 45.0 | 48.7 | 41.1 | 40.8 | 14.1 | Phase-separated |
| Test Agent 48 | MTPD R22 | 80.7 | 31 | PET3A | 45.0 | 48.7 | 62.9 | 59.7 | 17.7 | Phase-separated |

Figure 5:
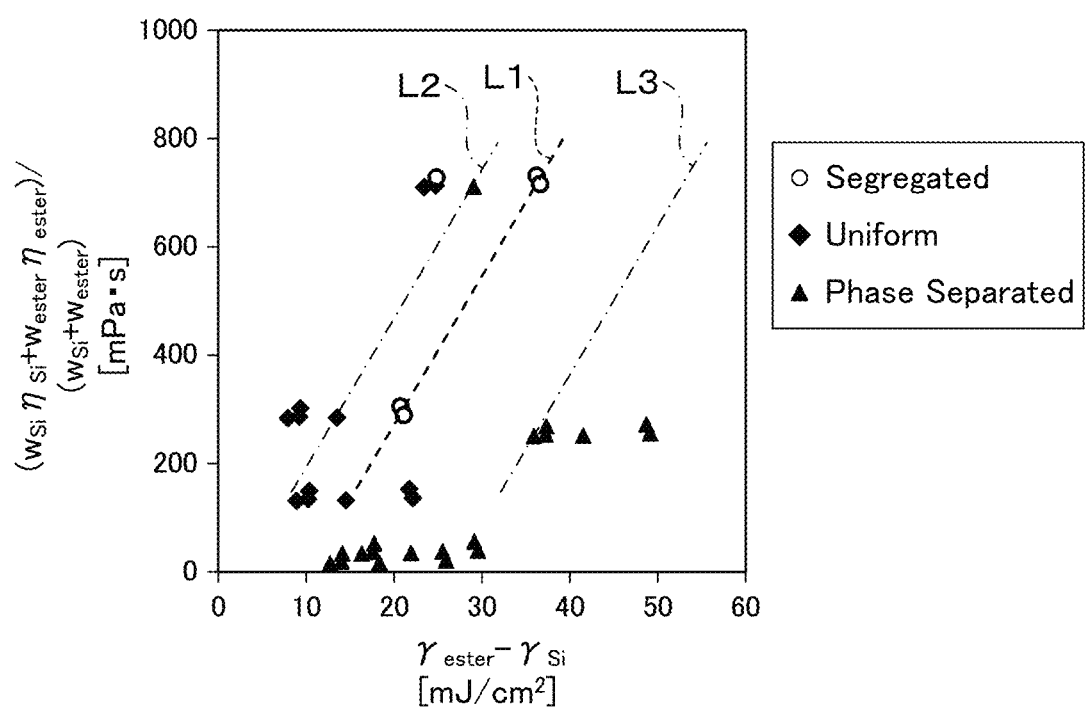
FIG. 5 is an explanatory diagram in which the structures of coating films prepared from test agents 13 to 42 in Example 6 are organized based on a weighted average of absolute viscosity and a difference in surface free energy.

FIG. 5 shows the result of organizing the distributions of the inorganic components of the coating film with the use of the value of the weighted average $(w_{Si}\eta_{Si}+w_{ester}\eta_{ester})/(w_{Si}+w_{ester})$ of the absolute viscosity $\eta_{Si}$ of the organosilicon compound and the absolute viscosity $\eta_{ester}$ of the polymerizable ester, and the value of the difference $\gamma_{ester}-\gamma_{Si}$ between the surface free energy $\gamma_{Si}$ of the organosilicon compound and the surface free energy ester of $\gamma_{ester}$ the polymerizable ester. The vertical axis of FIG. 5 represents the weighted average (unit: mPa·s) of the absolute viscosity $\eta_{Si}$ of the organosilicon compound and the absolute viscosity $\eta_{ester}$ of the polymerizable ester, and the horizontal axis thereof represents the difference $\gamma_{ester}-\gamma_{Si}$ (unit: mJ/cm$^2$) between the surface free energy $\gamma_{Si}$ of the organosilicon compound and the surface free energy $\gamma_{ester}$ of the polymerizable ester.

As shown in FIG. 5, the vicinities of data points that indicate the test agents 13, 14, 18, and 19 among the test agents with the inorganic components in the coating films segregated in the vicinities of the surfaces have no data points of the test agents with the inorganic components uniformly distributed or the test agents with the inorganic components and organic components phase-separated. Further, the weighted averages of the absolute viscosities in the test agents 13, 14, 18, and 19 can be approximated as a linear function of the surface free energy. The approximate line L1 of the data points of the test agents 13, 14, 18, and 19, determined by the least squares method, is expressed by formula (IIa):

[Mathematical Formula 6]

$$\frac{w_{Si}\eta_{Si}+w_{ester}\eta_{ester}}{w_{si}+w_{ester}}+331.2=32.946\times(\gamma_{ester}-\gamma_{Si}) \quad \text{(IIa)}$$

According to FIG. 5, a line L2 obtained by shifting the line L1 represented by the formula (IIa) by −7.0 in the horizontal axis direction has an overlap with the data point of the test agent 20 with the inorganic component non-segregated. Similarly, a line L3 obtained by shifting the line L1 represented by the formula (IIa) by +16.7 in the horizontal axis direction has an overlap with the data point of the test agent 27 with the inorganic component non-segregated.

Furthermore, in FIG. 5, the coating film can be understood to have a structure phase-separated into a phase containing an organic component as a main component and a phase containing an inorganic component as a main component when the weighted average of the absolute viscosity of the organosilicon compound at 60° C. and the absolute viscosity $\eta_{ester}$ of the polymerizable ester at 60° C. is 200 mPa·s or less.

Therefore, according to these results, it can be understood that the inorganic component can be segregated in the vicinity of the surface of the coating film when the condition (α) is satisfied, that is, when the absolute viscosity of the organosilicon compound at 60° C., the surface free energy $\gamma_{Si}$ of the organosilicon compound, the content $w_{Si}$ of the organosilicon compound, the absolute viscosity $\eta_{ester}$ of the polymerizable ester at 60° C., the surface free energy $\gamma_{ester}$ of the polymerizable ester, and the content $w_{ester}$ of the polymerizable ester satisfy the relationships of formulas (I) and (II):

[Mathematical Formula 7]

$$32.946\times(\gamma_{ester}-\gamma_{Si}-16.7) < \frac{w_{Si}\eta_{Si}+w_{ester}\eta_{ester}}{w_{si}+w_{ester}}+331.2 < 32.946(\gamma_{ester}-\gamma_{Si}+7.0) \quad \text{(I)}$$

[Mathematical Formula 8]

$$\frac{w_{Si}\eta_{Si}+w_{ester}\eta_{escer}}{w_{si}+w_{ester}} > 200 \quad \text{(II)}$$

Figure 6:
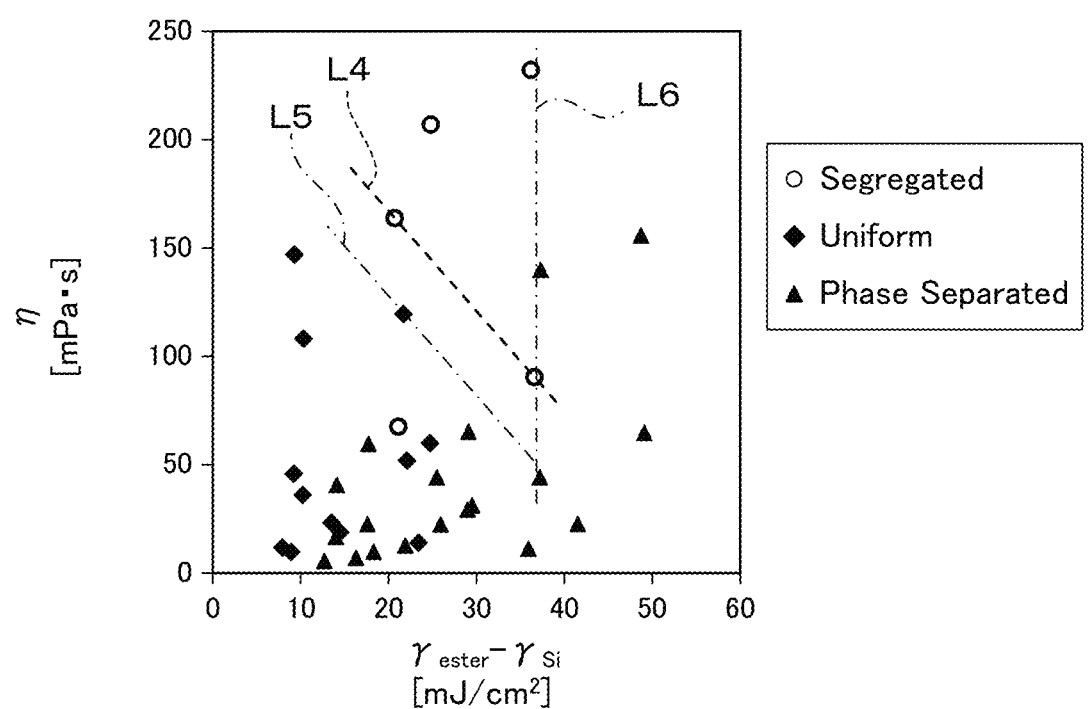
FIG. 6 is an explanatory diagram in which the structures of coating films prepared from test agents 13 to 42 in Example 6 are organized based on a mixed viscosity and a difference in surface free energy.

In addition, FIG. 6 shows the result of organizing the distributions of the inorganic components of the coating film with the use of the value of the mixed viscosity η of the organosilicon compound and polymerizable ester and the value of the difference $\gamma_{ester}-\gamma_{Si}$ between the surface free energy $\gamma_{Si}$ of the organosilicon compound and the surface free energy $\gamma_{ester}$ of the polymerizable ester. The vertical axis of FIG. 6 represents the mixed viscosity η (unit: mPa·s) of the organosilicon compound and polymerizable ester, represented by formula (V), and the horizontal axis thereof represents the difference $\gamma_{ester}-\gamma_{Si}$ (unit: mJ/cm²) between the surface free energy $\gamma_{Si}$ of the organosilicon compound and the surface free energy $\gamma_{ester}$ of the polymerizable ester.

[Mathematical Formula 9]

$$\log(\log(\eta + 1)) = \sum_{i=Si,ester} \frac{w_i}{w_{Si} + w_{ester}} (\log(\log(\eta_i + 1))) \quad (V)$$

As shown in FIG. 6, the vicinities of data points that indicate the test agents 13, 18, 19, 39 among the test agents with the inorganic components in the coating films segregated in the vicinities of the surfaces have no data points of the test agents with the inorganic components uniformly distributed or the test agents with the inorganic components and organic components phase-separated. Further, among these data points that indicate the test agents, a straight line L4 connecting the data point of the test agent 13 and the data point of the test agent 19 is represented by formula (IIIa):

[Mathematical Formula 10]

$$\eta = -4.6003(\gamma_{ester}-\gamma_{Si})+258.93 \quad (\text{III}\alpha)$$

According to FIG. 6, a line L5 obtained by shifting the line L4 by −39.46452 in the vertical axis direction has an overlap with the data point of the test agent 41 with the inorganic component non-segregated. In addition, as indicated by a line L6 in FIG. 6, in the range of the difference $\gamma_{ester}-\gamma_{Si}$ of 37 mJ/cm² or more between the surface free energy $\gamma_{Si}$ of the organosilicon compound and the surface free energy $\gamma_{ester}$ of the polymerizable ester, there are no data points of the test agents with the inorganic components segregated in the vicinities of the surfaces of the coating films.

Accordingly, according to these results, it can be understood that the inorganic component can be segregated in the vicinity of the surface of the coating film, also when the condition (β) is satisfied, that is, when the value of the mixed viscosity η of the organosilicon compound and polymerizable ester and the value of the difference $\gamma_{ester}-\gamma_{Si}$ between the surface free energy $\gamma_{Si}$ of the organosilicon compound and the surface free energy $\gamma_{ester}$ of the polymerizable ester satisfy the relationships of formulas (III) and (IV):

[Mathematical Formula 11]

$$\eta > -4.6003(\gamma_{ester}-\gamma_{Si})+219.4655 \quad (III)$$

[Mathematical Formula 12]

$$\gamma_{ester}-\gamma_{Si} < 37 \quad (IV)$$

It is noted while the film-forming component is cured without using the photobase generator in the present example, the distribution of the inorganic component is estimated to be substantially the same also in the case of using a nonionic photobase generator. Thus, also in the case of using a nonionic photobase generator, it is presumed that the inorganic component can be segregated in the vicinity of the surface of the coating film by combining the organosilicon compound and the polymerizable ester that satisfy the condition (α) or (β) described above.

The invention claimed is:
1. A coating agent comprising:
    a film-forming component containing an organosilicon compound having a radical polymerizable functional group and an alkoxysilyl group, and a polymerizable ester having a radical polymerizable functional group, wherein the polymerizable ester excludes the organosilicon compound; and
    a film-curing component composed so that a base and a radical can be generated on irradiation with ultraviolet light, wherein
    the film-curing component contains a nonionic photobase generator having no ionic bond in a molecular structure,
    a content of the nonionic photobase generator is 0.1 parts by mass or more and 50 parts by mass or less, based on 100 parts by mass of the organosilicon compound, and
    a content of the polymerizable ester is 0.1 times or more and 1000 times or less than a content of the organosilicon compound in terms of mass ratio,
    the coating agent satisfies at least one of two conditions: condition (α): the organosilicon compound and the polymerizable ester satisfy relationships of formulas (I) and (II), and condition (β): the organosilicon compound and the polymerizable ester satisfy relationships of formulas (III) and (IV):

[Mathematical Formula 1]

$$32.946 \times (\gamma_{ester}-\gamma_{Si}-16.7) < \frac{w_{Si}\eta_{Si}+w_{ester}\eta_{ester}}{w_{si}+w_{ester}} + 331.2 < 32.946(\gamma_{ester}-\gamma_{Si}+7.0) \quad (I)$$

[Mathematical Formula 2]

$$\frac{w_{Si}\eta_{Si}+w_{ester}\eta_{ester}}{w_{si}+w_{ester}} > 200 \quad (II)$$

[Mathematical Formula 3]

$$\eta > -4.6003(\gamma_{ester}-\gamma_{Si})+219.4655 \quad (III)$$

[Mathematical Formula 4]

$$\gamma_{ester}-\gamma_{Si} > 37 \quad (IV)$$

where, in the formulas (I) to (IV), $\gamma_{Si}$ represents surface free energy in mJ/cm² of the organosilicon compound, $\gamma_{ester}$ represents surface free energy in mJ/cm² of the polymerizable ester, $\eta_{Si}$ represents an absolute viscosity in mPa·s of the organosilicon compound at 60° C., $\eta_{ester}$ represents an absolute viscosity in mPa·s of the polymerizable ester at 60° C., $w_{Si}$ represents a content in g of the organosilicon compound, and $w_{ester}$ represents a content in g of the polymerizable ester, and η in the formula (III) represents a mixed viscosity in mPa·s of the organosilicon compound and the polymerizable ester, represented by formula (V):

[Mathematical Formula 5]

$$\log(\log(\eta+1)) = \sum_{i=Si,ester} \frac{w_i}{w_{Si}+w_{ester}} (\log(\log(\eta_i+1))) \quad (V)$$

2. The coating agent according to claim 1, wherein the film-curing component further contains 0.1 parts by mass or more and 50 parts by mass or less of a photoradical polymerization initiator based on 100 parts by mass of the film-forming component.

3. The coating agent according to claim 2, wherein a total number of the radical polymerizable functional groups in polymerizable ester is three or more per molecule.

4. A resin member comprising:
   a substrate made of a resin; and
   a coating film made of a cured product of the coating agent according to claim 1 and disposed on a surface of the substrate, wherein
   the coating film has:
      a structural unit derived from the radical polymerizable functional group; and
      a structural unit having a siloxane bond, and
   a concentration of the siloxane bond in the coating film is maximum at an outermost surface of the coating film.

5. The resin member according to claim 4, wherein the concentration of the siloxane bond in the coating film continuously decreases in a depth direction toward the substrate.

6. The resin member according to claim 4, wherein the substrate is made of a polycarbonate resin.

7. A method for producing a resin member, the method comprising:
   a preparing step of preparing a substrate made of a resin;
   a coating step of applying the coating agent according to claim 1 on a surface of the substrate; and
   a curing step of irradiating the coating agent with ultraviolet light to form a coating film made of a cured product of the coating agent on the surface of the substrate.

8. The method for producing a resin member according to claim 7, wherein in the preparing step, a substrate made of a polycarbonate resin is prepared as the substrate.

* * * * *